US011195301B1

(12) United States Patent
Lev

(10) Patent No.: US 11,195,301 B1
(45) Date of Patent: Dec. 7, 2021

(54) ESTIMATION OF HEAD YAW IN AN IMAGE

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 0 days.

(21) Appl. No.: 16/938,987

(22) Filed: Jul. 26, 2020

(51) Int. Cl.
*G06T 7/73* (2017.01)
*G06K 9/00* (2006.01)

(52) U.S. Cl.
CPC ............ *G06T 7/74* (2017.01); *G06K 9/00255* (2013.01); *G06K 9/00281* (2013.01); *G06K 9/00288* (2013.01); *G06T 2207/30201* (2013.01)

(58) Field of Classification Search
CPC ............ G06T 7/74; G06T 2207/30201; G06K 9/00255; G06K 9/00288; G06K 9/00281
See application file for complete search history.

(56) References Cited

U.S. PATENT DOCUMENTS

| | | | | |
|---|---|---|---|---|
| 6,028,960 A * | 2/2000 | Graf | ......... | G06K 9/00268 382/100 |
| 6,246,779 B1 * | 6/2001 | Fukui | ......... | G06K 9/00268 382/100 |
| 6,549,644 B1 * | 4/2003 | Yamamoto | ......... | G06K 9/00268 382/118 |
| 6,707,933 B1 * | 3/2004 | Mariani | ......... | G06K 9/00228 340/5.83 |
| 11,017,216 B2 * | 5/2021 | Taoka | ......... | A61B 5/0077 |
| 2006/0188144 A1 * | 8/2006 | Sasaki | ......... | G06T 17/10 382/154 |
| 2007/0071289 A1 * | 3/2007 | Takeguchi | ......... | G06K 9/00281 382/118 |
| 2008/0232650 A1 * | 9/2008 | Suzuki | ......... | G06K 9/00281 382/118 |
| 2014/0369553 A1 * | 12/2014 | Tsou | ......... | G06K 9/00281 382/103 |
| 2016/0045109 A1 * | 2/2016 | Tsou | ......... | A61B 3/0025 351/208 |
| 2017/0068843 A1 * | 3/2017 | Tian | ......... | G06K 9/00281 |
| 2019/0156100 A1 * | 5/2019 | Rougeaux | ......... | G06F 3/013 |
| 2019/0172222 A1 * | 6/2019 | Ebisawa | ......... | A61B 3/113 |

* cited by examiner

*Primary Examiner* — Wesley J Tucker

(57) ABSTRACT

There is provided a method of computing head pose of a subject in a 2D image, comprising: analyzing the image to identify a first nostril, a second nostril, a medial eye substructure of a first and a second eye, and a lateral eye substructure of the first and the second eye, computing a median nostril point between the first and second nostrils, computing a horizontal line that connects the lateral eye substructures of the first and second eyes, computing a vertical axis line that is orthogonal to the horizontal line and passes through a median eye point between the medial eye substructures of the first and second eyes, computing an offset distance between the vertical axis line and the median nostril point, and computing an indication of an estimated yaw angle of the head pose of the subject based on the offset distance.

16 Claims, 10 Drawing Sheets

ESTIMATION OF HEAD YAW IN AN IMAGE

FIELD AND BACKGROUND OF THE INVENTION

The present invention, in some embodiments thereof, relates to image processing and, more specifically, but not exclusively, to systems and methods for estimation of a head yaw of a head pose of a subject depicted in the image.

Head pose estimation is a step performed as part of most face recognition systems, and/or other applications that use head pose, for example, social event analysis (e.g., to determine who the person is speaking to), human computer interaction (e.g., activate features based on the gaze of the user), and driver assistance systems (e.g., monitor what the driver is looking at). The head pose estimation may be used, for example, in the alignment phase of such face recognition systems.

SUMMARY OF THE INVENTION

According to a first aspect, A computer implemented method of computing head pose of a subject in a two dimensional (2D) image, comprises: receiving a 2D image of a face of a subject depicting nostrils of the subject, analyzing the image to identify a first nostril, a second nostril, a medial eye substructure of a first eye and of a second eye located medially to the respective eye, and a lateral eye substructure of the first eye and the second eye located laterally to the respective eye, computing a median nostril point between a first location of the first nostril and a second location of the second nostril, computing a horizontal line that horizontally connects the lateral eye substructure of the first eye with the lateral eye substructure of the second eye, computing a vertical axis line that is orthogonal to the horizontal line and passes through a median eye point between the medial eye substructure of the first eye and the medial first eye substructure of the second eye, computing an offset distance between the vertical axis line and the median nostril point, and computing an indication of an estimated yaw angle of the head pose of the subject based on the offset distance.

According to a second aspect, a computing device for computing head pose of a subject in a two dimensional (2D) image, comprises: at least one processor executing a code for: receiving a 2D image of a face of a subject depicting nostrils of the subject, analyzing the image to identify a first nostril, a second nostril, a medial eye substructure of a first eye and of a second eye located medially to the respective eye, and a lateral eye substructure of the first eye and the second eye located laterally to the respective eye, computing a median nostril point between a first location of the first nostril and a second location of the second nostril, computing a horizontal line that horizontally connects the lateral eye substructure of the first eye with the lateral eye substructure of the second eye, computing a vertical axis line that is orthogonal to the horizontal line and passes through a median eye point between the medial eye substructure of the first eye and the medial first eye substructure of the second eye, computing an offset distance between the vertical axis line and the median nostril point, and computing an indication of an estimated yaw angle of the head pose of the subject based on the offset distance.

According to a third aspect, a non-transitory medium storing a computer program comprising program instructions which, when executed by a processor, cause the processor to: receive a 2D image of a face of a subject depicting nostrils of the subject, analyze the image to identify a first nostril, a second nostril, a medial eye substructure of a first eye and of a second eye located medially to the respective eye, and a lateral eye substructure of the first eye and the second eye located laterally to the respective eye, compute a median nostril point between a first location of the first nostril and a second location of the second nostril, compute a horizontal line that horizontally connects the lateral eye substructure of the first eye with the lateral eye substructure of the second eye, compute a vertical axis line that is orthogonal to the horizontal line and passes through a median eye point between the medial eye substructure of the first eye and the medial first eye substructure of the second eye, compute an offset distance between the vertical axis line and the median nostril point, and compute an indication of an estimated yaw angle of the head pose of the subject based on the offset distance.

In a further implementation form of the first, second, and third aspects, further comprising receiving a plurality of images each depicting the face of the person at a plurality of yaw angles, computing a respective offset distance for each of the plurality of images, and selecting a target image indicative of a full frontal frame of the face of the subject according to a minimal respective offset distance.

In a further implementation form of the first, second, and third aspects, the target image with minimal respective offset distance denotes a yaw angle of less than about 5 degrees.

In a further implementation form of the first, second, and third aspects, further comprising computing a dimensionless ratio computed as the offset distance divided by an estimation of head width computed as the length of the first horizontal line between the lateral eye substructure of the first eye and the lateral eye substructure of the second eye, where the dimensionless ratio is correlated with the yaw of the head pose, wherein the yaw is estimated based on the dimensionless ratio.

In a further implementation form of the first, second, and third aspects, further comprising generating instructions for implementation by a user interface to direct the subject to move their head to obtain a minimal offset distance.

In a further implementation form of the first, second, and third aspects, the estimated yaw angle is computed independently of a pitch angle of the head and independently of a roll angle of the head.

In a further implementation form of the first, second, and third aspects, analyzing the image to identify the first nostril and the second nostril comprises processing the image to identify a first and a second contiguous set of pixels below a grayscale threshold in a green channel of the image.

In a further implementation form of the first, second, and third aspects, analyzing the image to identify the medial eye substructure of a first eye and of a second eye comprises performing a template matching process between the image and a template image using normalized 2D cross correlation and/or scale and 2D rotation search space.

In a further implementation form of the first, second, and third aspects, the medial eye substructure comprises an inner edge of a tear duct of the respective eye.

In a further implementation form of the first, second, and third aspects, further comprising providing the indication of estimation of yaw angle to a face processing process.

In a further implementation form of the first, second, and third aspects, further comprising: in response to the offset distance being about zero, identifying the image as a fully frontal frame of the face of the subject having about zero yaw, and providing the image as an input to a facial recognition process that is designed to process fully frontal frames with zero yaw.

In a further implementation form of the first, second, and third aspects, further comprising processing the image using the facial recognition process to recognize a target person depicted in the image, and in response to the recognized target person matching a security requirement, granting access security clearance to the subject.

In a further implementation form of the first, second, and third aspects, the image is captured by a camera located below the nose of the subject, the viewing angle of the camera angled up towards the nostrils.

In a further implementation form of the first, second, and third aspects, further comprising generating instructions for implementation by a user interface for providing a message to the subject to at least one of: (i) tilt their head upwards, wherein the received image depicts the subject with head tilted upwards, and (ii) place a camera that captures the 2D image below the nose at an angle facing upwards towards the nostrils.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
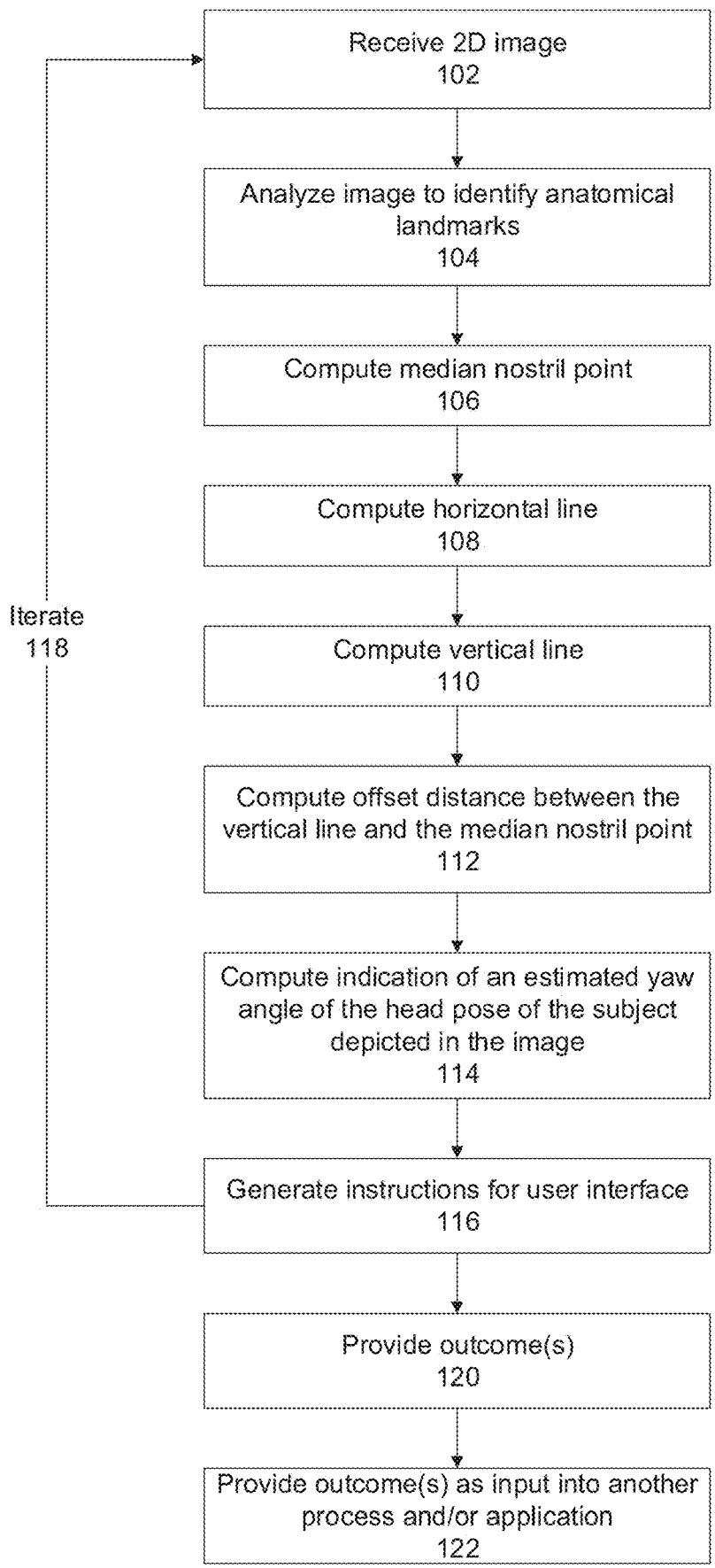
FIG. 1 is a flowchart of a method of computing an indication of yaw angle for an image of a head based on anatomical landmarks, in accordance with some embodiments of the present invention.

The present invention, in some embodiments thereof, relates to image processing and, more specifically, but not exclusively, to systems and methods for estimation of a head yaw of a head pose of a subject depicted in the image.

At least some implementations of the system, methods, apparatus, and/or code instructions described herein address the technical problem of computation and/or estimation of a yaw angle of a head pose of a head of a subject depicted in a two dimensional (2D) image. At least some implementations of the system, methods, apparatus, and/or code instructions described herein improve the technical field of computation and/or estimation of a yaw angle of a head pose of a head of a subject depicted in a 2D image. Yaw may be difficult to estimate in images using standard approaches, for example, due to illumination changes, bad frames, presence of facial hair, and presence of makeup on the face, different facial gestures. Yaw may take a significant amount of time to compute using standard approaches, in particular, where many sequential images are obtained at different yaw angle (e.g., as a video) in order to select one full frontal images (e.g., yaw angle less than about 5 degrees). The processing time may be high, for example, when computationally heavy processes are executed using few available computational hardware resources, for example, images captured by a camera of a smartphone processed by a neural network, locally by the smartphone and/or centrally by a server that handles thousands of such images. For yaw estimation, the state of the art is about 5-10 degrees root mean square (RMS), based on full face landmark detection and model fitting. Estimation of yaw may be needed quickly and/or reliably in order to detect full frontal images of the face, which may be required as input into a high grade facial recognition process. For full frontal images of the face, the estimation of yaw angle is less than about 5 degrees.

At least some implementations of the system, methods, apparatus, and/or code instructions described herein address the above mentioned technical problem, and/or improve the above mentioned technical problem, by identifying and using six features of the face, to compute an estimation of the yaw angle of the head pose, which in some embodiments enables selection of the full frontal pose based on the indication of the lowest yaw angle. The indication of estimated yaw angle, in comparison to standard approaches, is computed quickly more quickly, and/or with fewer computational hardware resource, and/or is more robust to illumination changes, and/or is more invariant to facial hair, makeup, and/or gestures.

Inventors discovered the medial eye substructures, optionally the inner edge of the eye tear ducts, at the eye inner canthus, are well defined visually and/or have a distinct shape, and are unaffected by illumination, gestures, and/or makeup. Using the medial eye substructures may provide a more accurate estimation of the yaw angle, even in the presence of illumination, gestures, and/or makeup. Inventors also discovered that nostrils of the subject may be clearly segmented and/or identified even when the shape of the nostrils varies between different people, and/or varies between the same person at different camera angles. Nostrils are unaffected by facial hair (e.g., mustache), no makeup is applied, and nostrils are not typically blocked (e.g., except when the subject is wearing a mask, in which case facial recognition is irrelevant). A median point located between the identified nostrils, optionally between the two centers of gravities of the two sets of pixels corresponding to the two nostrils, provides a good estimate of a point on the vertical axis line (as described herein), since the two centers of gravities of the nostrils are relatively close to one another and/or on opposite sides of the head axis of symmetry.

Inventors further discovered that using the medial eye substructures of each of the two eyes, optionally the inner eye canthi, is accurately identified. The process of identifying medial eye substructures is robust to illumination, makeup, and/or facial gestures, since the medial eye substructure is a rigid part of the head. A median point located between the two medial eye substructures provides a good estimate of a point on the vertical axis line (as described herein), since the two medial eye substructures are relatively close to one another and/or on opposite sides of the head axis of symmetry.

Inventors further discovered that using the lateral eye substructures of each of the two eyes (for computation of the horizontal line therebetween, as described herein) is accurately identified and/or constant in the vertical direction. The process of identifying lateral eye substructures is robust to illumination and/or makeup application. Since the two lateral eye substructures are relatively apart, and are generally symmetric, an error in identification of the location of one or both of the lateral eye substructures may be irrelevant if the error is horizontal and/or may not significantly affect slope of the horizontal line when the error of identified location of one or both of the lateral eye substructures is small and/or symmetrical in the vertical direction. Therefore, the horizontal line between the two lateral eye substructures is not necessarily sensitive to horizontal shifts and/or vertical (identical shifts) that may occur for example due to makeup, which may correct for head roll.

Inventors discovered that for the horizontal line that connects the two medial eye substructures, the vertical axis line which is orthogonal to the horizontal line and passes through a median eye point between the two medial eye substructures of the eyes, passes close to a median nostril point between locations (e.g., center of masses) of the nostrils defined by an offset distance. The offset distance correlates with an estimated yaw angle of the head pose of the subject. In at least some embodiments, the computation of the offset distance and hence the estimated yaw angle is invariant to head roll and/or to head pitch. In at least some embodiments, the computation of the offset distance and hence the estimated yaw angle is invariant to other facial features, for example, pupil gaze direction, mouth, makeup, facial hair, and/or facial gestures.

It is noted that the computation of the offset distance and hence the estimated yaw angle is accurate for low yaw angles, for example less than about 5, 10, 15, 20, 25, 30, or 45 degrees.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
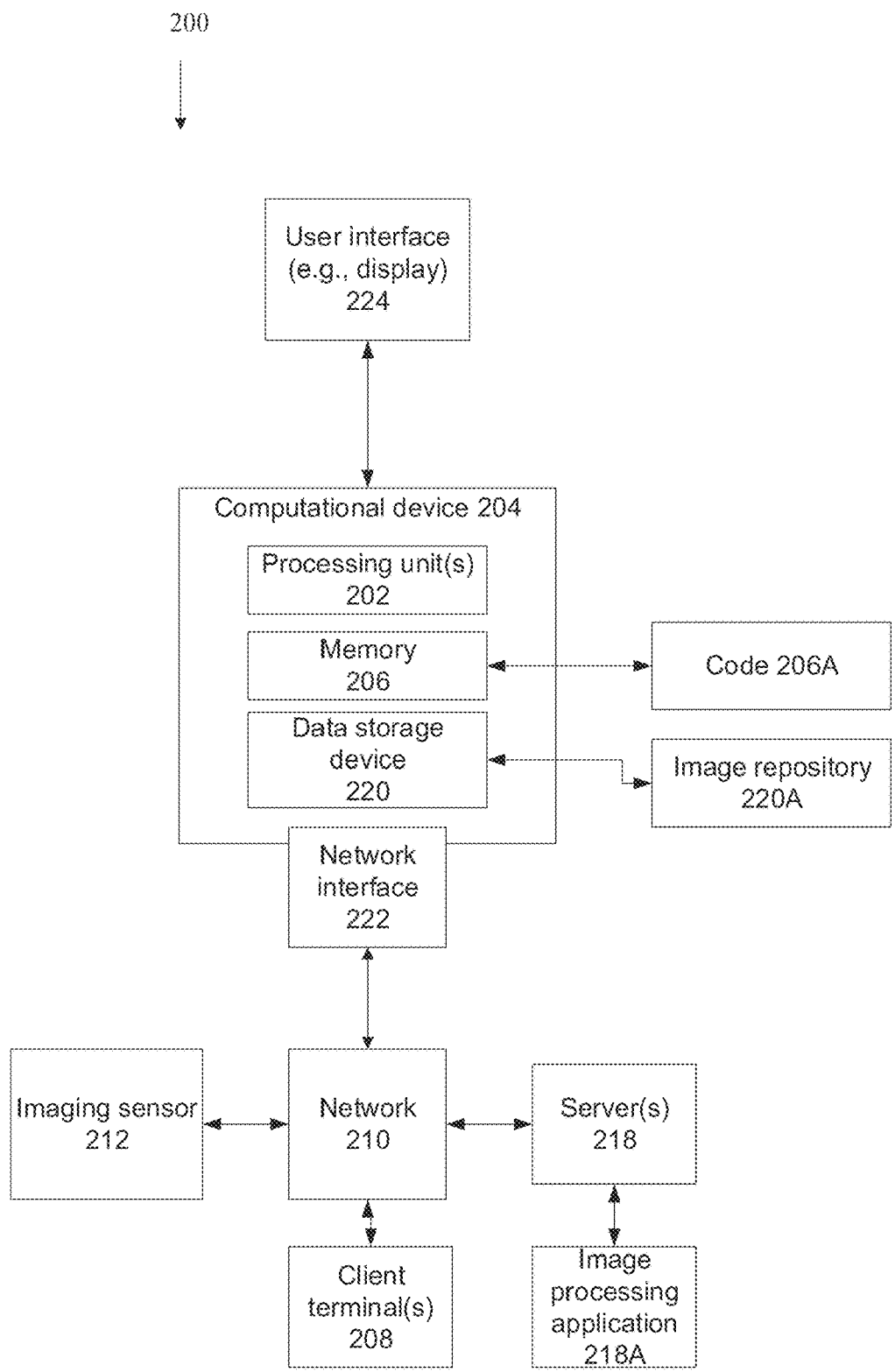
FIG. 2 is a block diagram of components of a system 200 for computing an indication of yaw angle for an image of a head based on anatomical landmarks, in accordance with some embodiments of the present invention.

Reference is now made to FIG. 1, which is a flowchart of a method of computing an indication of yaw angle for an image of a head based on anatomical landmarks, in accordance with some embodiments of the present invention. Reference is also made to FIG. 2, which is a block diagram of components of a system 200 for computing an indication of yaw angle for an image of a head based on anatomical landmarks, in accordance with some embodiments of the present invention. System 200 may implement the features of the method described with reference to FIG. 1, by one or more hardware processors 202 of a computing device 204 executing code instructions stored in a memory (also referred to as a program store) 206.

Computing device 204 may be implemented as, for example, a client terminal, a server, a virtual machine, a virtual server, a computing cloud, a mobile device, a desktop computer, a thin client, a Smartphone, a Tablet computer, a laptop computer, a wearable computer, glasses computer, and a watch computer.

Multiple architectures of system 200 based on computing device 204 may be implemented. In an exemplary implementation, computing device 204 storing code 206A may be implemented as one or more servers (e.g., network server, web server, a computing cloud, a virtual server) that provides services (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development kit (SDK)), providing an application for local download to the servers 218 and/or client terminal(s) 208, and/or providing functions using a remote access session to the servers 218 and/or client terminal(s) 208, such as through a web browser and/or viewing application. For example, users use client terminals 208 to access computing device 204 to provide one or more images of a face (e.g., their face, a face of another person) and/or view the computed indication of estimated yaw angle of the head pose. In another example, code 206A is obtained from computing device 204, and/or locally executed on client terminal 208 and/or on server 218. For example, a user may use code 206A executing on client terminal 208 to select a frontal face image according to lowest yaw angle (e.g., close to zero or zero), and/or to direct the user how to position their face to obtain the lowest yaw angle. The frontal face image may be used, for example, to train a face recognition application (e.g., 218A) to recognize the subject. In yet another example, code 206A may be obtained from computing device 204, and/or locally executed by server 218. For example, as a first step to obtain an image with low or minimal yaw angle, and/or to compute an estimate of the yaw angle. The image is then inputted into an image processing application 218A (e.g., running on server 218 and/or on another device), for example, a face recognition application, and/or a driver assistance application.

Computing device 204 receives images captured by an imaging sensor 212. Sensor 212 may be standard visible light sensors (e.g., CCD, CMOS sensors, and/or red green blue (RGB) sensor). Sensor 212 sensor has sufficiently high resolution capable of depicting and/or identifying the medial and/or lateral eye sub structures in captured images.

Sensor 212 may transmit captured images to computing device 204, for example, via a direct connected (e.g., local bus and/or cable connection and/or short range wireless connection), and/or via a network 210 and a network interface 222 of computing device 204 (e.g., where sensors are connected via internet of things (IoT) technology and/or are located remotely from the computing device).

Network interface 222 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIG. 1.

Computing device 204 may include data storage device 220 for storing data, for example, image repository 220A for storing images captured by imaging sensor 212, for example, for selecting the image with lowest yaw angle, as described herein. Data storage device 220 may be implemented as, for example, a memory, a local hard-drive, a removable storage unit, an optical disk, a storage device, a virtual memory and/or as a remote server 218 and/or computing cloud (e.g., accessed over network 210).

Computing device 204 and/or client terminal(s) 208 and/or server(s) 218 include and/or are in communication with one or more physical user interfaces 224 that include a mechanism for inputting data and/or for viewing data, for example, a display for presenting the identified image with lowest yaw angle. A user may press a button of user interface 224 to capture each image. Exemplary user interfaces 224 include, for example, one or more of, a touchscreen, a display, a keyboard, a mouse, and voice activated software using speakers and microphone.

Referring now back to FIG. 1, at 102, a 2D image depicting a face of a subject is received. The 2D image is captured by a 2D sensor, optionally a camera. The 2D image may be a frame of a video, and/or a still image. The 2D image may be captured in the visible light spectrum. The 2D image may be a color image.

The 2D image depicts at least a sufficient portion of the nostril of the subject, enabling automated detection of the nostril, as described herein. As described below, when the nostril cannot be detected or cannot be detect4ed with a reliable accuracy (e.g., value indicative of likelihood of correct identification of nostril is below a defined threshold) instructions may be generated to direct the user to reorient their head to enable imaging of the nostril, for example, tilt the head up.

Optionally, the image is captured by a camera located below the level of the nose of the subject. The viewing angle of the camera is angled up towards the nostrils, for capturing at least a sufficient portion of the nostril of the subject for enabling automated detection of the nostril.

At 104, the image is analyzed to identify multiple anatomical landmarks, including: a first (i.e., left) nostril, a second (i.e., right) nostril, a medial eye substructure of a first (i.e., left) eye and of a second (i.e., right) eye located medially to the respective eye, and a lateral eye substructure of the first (i.e., left) eye and the second (i.e., right) eye located laterally to the respective eye. The medial eye substructure may include an inner edge of a tear duct, at the eye inner canthus, of the respective eye.

The anatomical landmarks are selected based on satisfying one or more of: visually well defined landmarks enabling high detection accuracy (e.g., when captured by high resolution image sensors which are commonly available such as a camera of a smartphone), distinct shape enabling high detection accuracy, and/or being unaffected significantly by different illuminations, different facial gestures, presence of facial hair, different eye views (e.g., direction that pupils are pointing), and/or presence of makeup, enabling accurate detection of the anatomical landmarks even in the presence of the different illumination, facial gestures, facial hair, eye views, and/or makeup. Although the shape of the nostril may vary between individuals and/or depending on the angle of the sensor capturing the image, the air intakes appear much darker (e.g., lower pixel intensity values) than the surrounding nasal area under different illuminations. The nostrils may be the air intakes into fibro fatty tissue. The lateral eye substructures may be localized with high accuracy based on eyeball reflectivity and/or unique color. The lateral eye substructures are substantially constant in the vertical direction, even under severe illumination and/or strong makeup application, providing reliably located anatomical landmarks.

Optionally, a center of each nostril is found. The center may be defined as a center of mass of pixels depicting the respective nostril.

The anatomical landmarks may be accurately (e.g., reliably) detected using non-classifier (e.g., non-neural network) approaches, for example, template matching and/or normalized 2D cross correlation and/or scale and 2D rotation search space, edge detection, analysis of pixel intensity values of continuous pixel clusters, and the like, for example, as described herein. Use of non-classifier approaches for accurate detection of the anatomical landmarks may enable execution of the process described herein rapidly, for example, analysis of frames of a video on a smartphone, and/or rapid analysis of multiple images of different people by a single processor, and the like. Neural networks and/or other classifiers may be too slow and/or may require large amounts of processing hardware for real time analysis, for example, for granting security access to many users looking to board a plane. Alternatively or additionally, the anatomical landmarks are localized using a classifier (e.g., neural network, for example, a convolutional neural network) trained on a training dataset of images on which the anatomical landmark(s) are labelled. The neural network may be used, for example, when time considerations are not a significant factor, and/or when sufficient processing resources are available.

Figure 3:
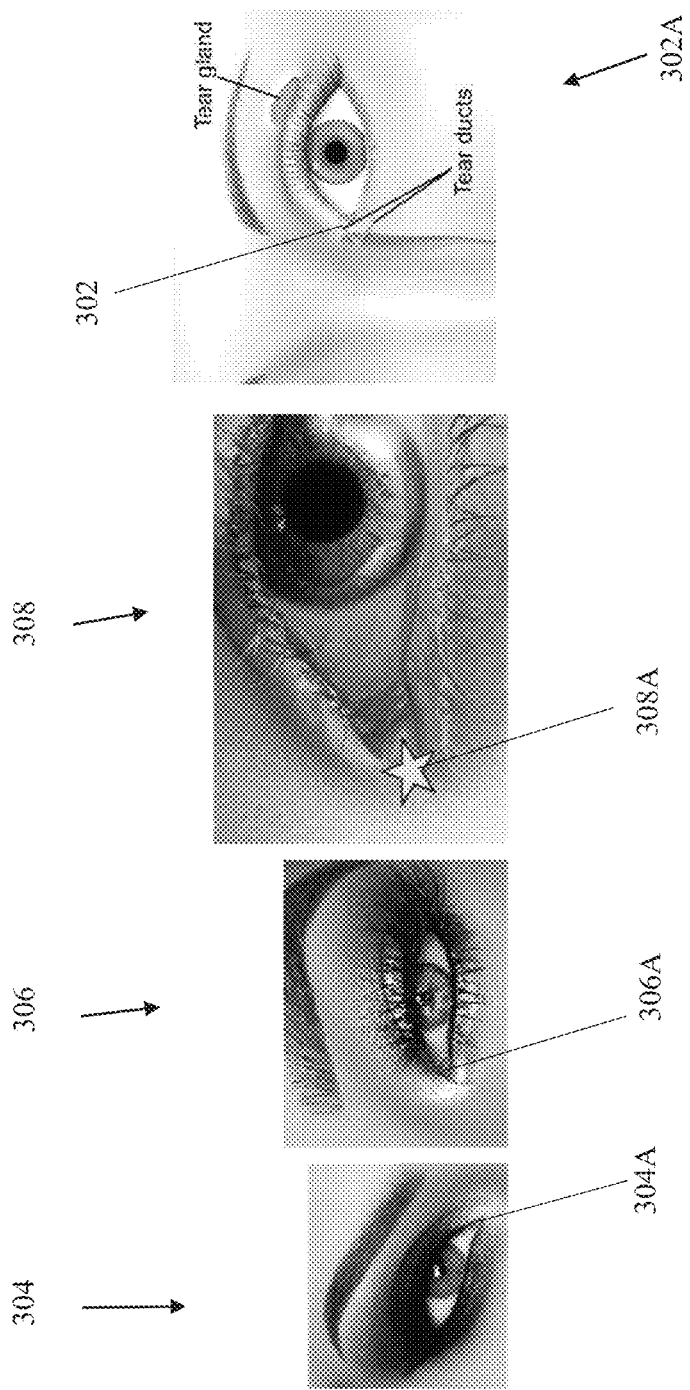
FIG. 3 includes a schematic and images depicting a respective medial eye substructure including an inner edge of a tear duct, at the eye inner canthus, of the respective eye, in accordance with some embodiments of the present invention.

Reference is now made to FIG. 3, which includes a schematic 302, and images 304-8, each depicting a respective medial eye substructure 302A-08A including an inner edge of a tear duct, at the eye inner canthus, of the respective eye, in accordance with some embodiments of the present invention.

Figure 4:
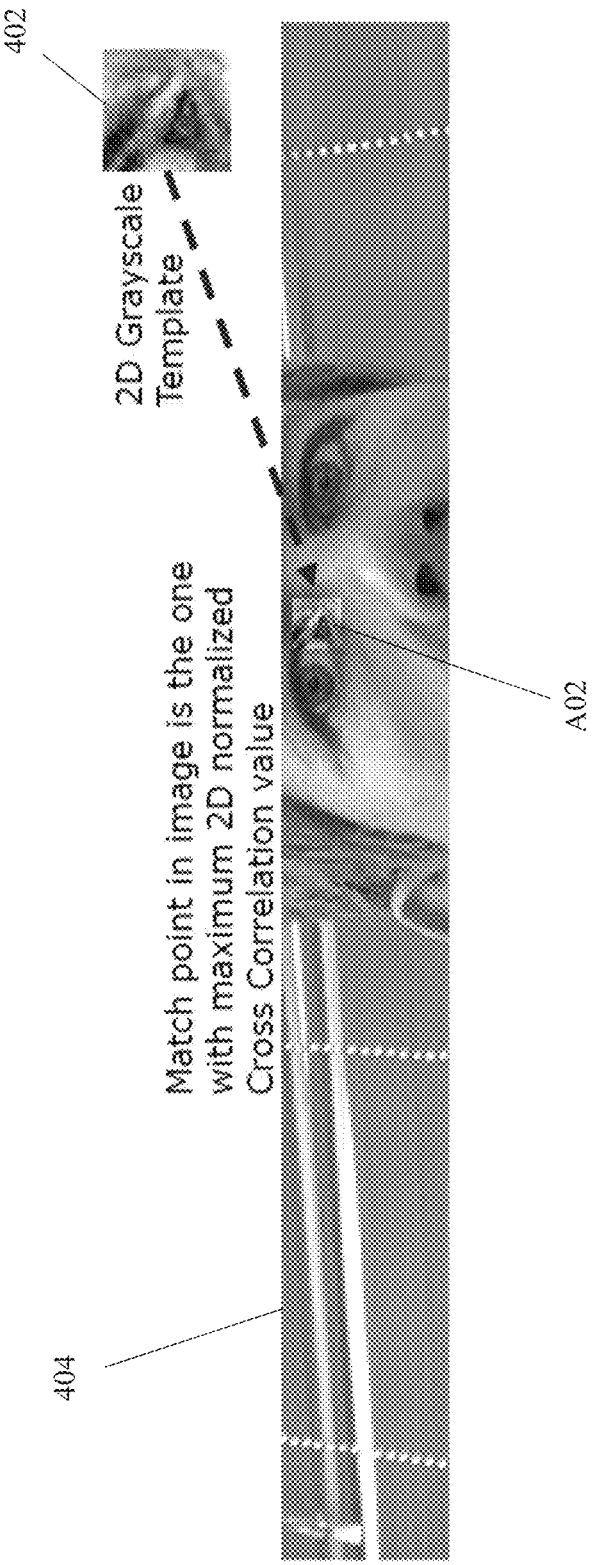
FIG. 4 depicts a process of matching a template to an image for identifying one or more anatomical landmarks, in accordance with some embodiments of the present invention.

Reference is now made to FIG. 4, which depicts a process of matching a template 402 to an image 404 for identifying one or more anatomical landmarks, in accordance with some embodiments of the present invention. As shown, template 402 depicts an inner edge of a tear duct, at the eye inner canthus, of the respective eye, for example, there may be a template for the left eye and another template for the right eye. The template for the left and right eye may be the same template to which a mirror transformation is applied. As shown, template 402 is for the right eye of the subject. Template 402 is matched to region 406 of image 404 that depicts the inner edge of the tear duct, at the eye inner canthus, of the right eye of the subject. The pixels of image 404 are determined as matching to pixels of template 402 when a maximum 2D normalized cross correlation value between pixels of image 404 and pixels of template 402 is found, after optional scaling and/or after a 2D rotation and/or search in the space of image 404.

A similar approach using templates of other anatomical landmarks described herein may be used to localize the other anatomical landmarks in the image.

It is noted that the template may be a grayscale template that is used with a 2D image captured in grayscale and/or coveted to grayscale. The grayscale may improve matching of the template to the image, by reducing effects, for example, of different eye colors, different skin tones (e.g., skin appears a different color under different lights and/or different times of the day), makeup, and illumination effects.

Figure 5:
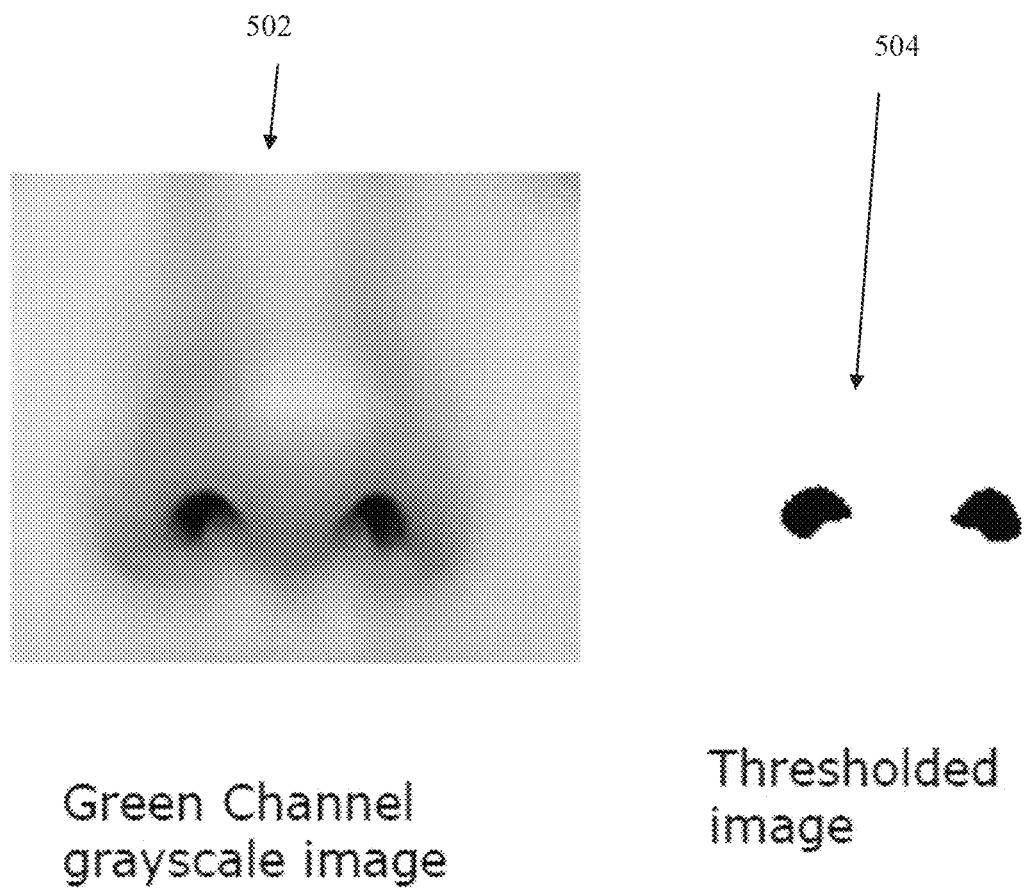
FIG. 5 includes a green channel grayscale image of the nostrils and surrounding nasal region of the subject, and a thresholded image depicting nostrils segmented from image, in accordance with some embodiments of the present invention.

Reference is now made to FIG. 5, which includes a green channel grayscale image 502 of the nostrils and surrounding nasal region of the subject, and a thresholded image 504 depicting nostrils segmented from image 502, in accordance with some embodiments of the present invention. The green channel may be extracted from a color image, and converted to grayscale. Potential advantages of using grayscale over colored have been discussed above.

Nostrils in image 504 are found by identifying two (i.e., left and right, also referred to herein as a first and a second) contiguous set of pixels below a grayscale threshold in the green channel grayscale image 502.

Optionally, a center of each nostril is found. The center may be defined as a center of mass of pixels in a contiguous set of pixels below a certain grayscale value in the green channel of the image.

Referring now back to FIG. 1, at 106, a median nostril point between a first location of the first (e.g., left) nostril and a second location of the second nostril (e.g., right, or left when the first nostril is the right nostril) is computed.

The median nostril point is located in the middle of a line connecting the first location of the first nostril and the second location of the second nostril. The line in the 2D image may represent an estimation of a 3D line connecting first and second locations of the first and second nostrils on the real 3D face of the person.

The first and/or second locations may be, for example:
Center of masses of pixels representing the first and second nostrils.
A model (e.g., machine learning and/or artificial intelligence model and/or statistical model) that reconstructs the actual nostril based on the 2D shape of each nostril as it appears in the 2D image. For example, a machine learning model that is trained on a training dataset of 2D images depicting nostrils of different people, and a corresponding label of actual nostril shape (e.g., obtained from a 3D image and/or measurements of images directed towards and/or focused on the nostrils).
Pixels (and/or points) on the first and second nostrils of the 2D image that are closest to one other (i.e., when the shortest distance between the two nostrils is computed, the points of the two nostrils that result in the shortest distance).
Pixels (and/or points) on the first and second nostrils of the 2D image that are farthest from one other (i.e., when the longest distance between the two nostrils is computed, the points of the two nostrils that result in the longest distance).
A combination of the aforementioned, for example, weighted average thereof.

Figure 10:
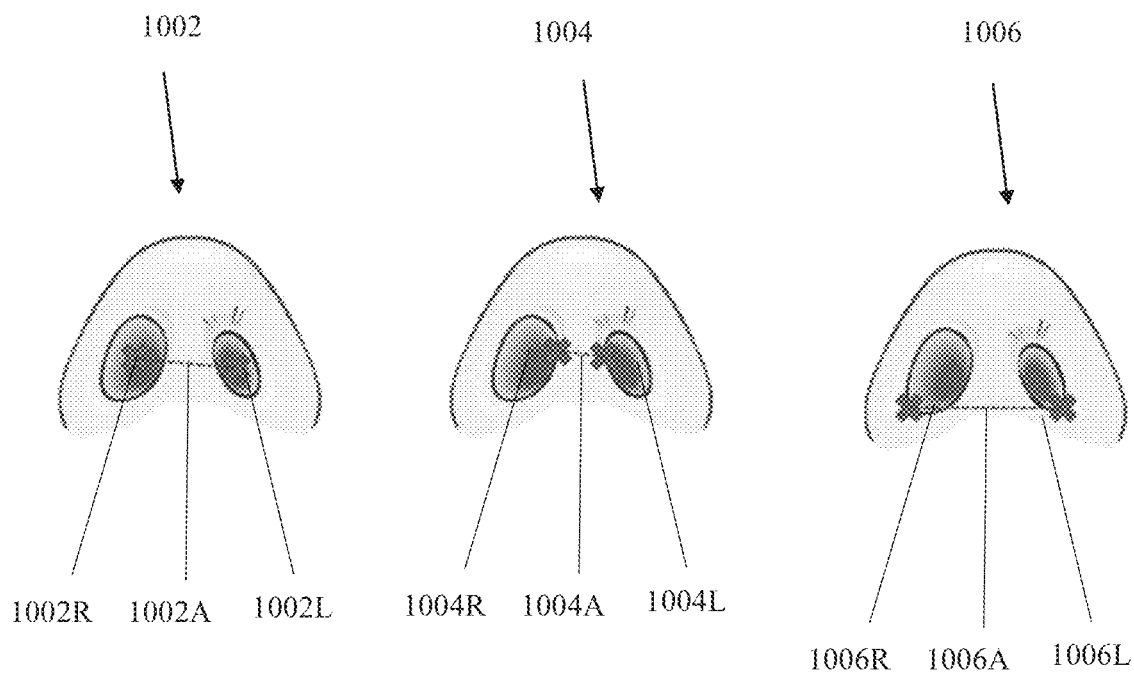
FIG. 10, which is a schematic depicting examples of computing the median nostril point, in accordance with some embodiments of the present invention.

Reference is now made to FIG. 10, which is a schematic depicting examples of computing the median nostril point, in accordance with some embodiments of the present invention. Schematic 1002 depicts median nostril point located along a line 1002A connecting a first location 1002R of a first nostril computed as a center of mass of pixels of the first nostril, and a second location 1002L of a second nostril computed as a center of mass of pixels of the second nostril. Schematic 1004 depicts median nostril point located along a line 1004A connecting a first point 1004R of a first nostril and a second point 1004L of a second nostril that are closest to one another. Schematic 1006 depicts median nostril point located along a line 1006A connecting a first point 1006R of a first nostril and a second point 1006L of a second nostril that are furthest away from one another.

Referring now back to 106 of FIG. 1, the nostrils may be easily and/or accurately located and/or segmented, in particular when the image is captured by a sensor located below the level of the head, and/or when the head is raised in the pitch direction relative to an image sensor located at the level of the head. Nostrils are robust to facial hair and/or makeup. Nostrils are close to one another and located on opposite sides of an axis of symmetry of the head. A point located between the centers of gravity of the two segmented tonsils provides a good estimate for a point on the axis of symmetry of the head.

At 108, a horizontal line that horizontally connects the lateral eye substructure of the first eye with the lateral eye substructure of the second eye is computed.

The equation of the horizontal line may be computed using the location of the two lateral eye substructures.

The slope of the horizontal line represents an estimate of head roll.

The horizontal line is selected based on Inventor's observation that the horizontal line is not significantly sensitive to horizontal shifts and/or vertical (e.g., identical) shifts due to makeup. The lateral eye substructures are relatively robust to illumination and/or makeup. The lateral eye substructures are relatively far apart (in comparison to other anatomical features on the face) and are generally symmetric. An error in locating one or both of the lateral eye substructures (e.g., due to makeup) may be irrelevant, such as when the error is horizontal and/or symmetrical to both lateral eye substructures, by not affecting the slope of the horizontal line.

At 110, a vertical axis line that is orthogonal to the horizontal line, and passes through a median eye point between the medial eye substructure of the first eye and the medial first eye substructure of the second eye (i.e., the left and right eyes), is computed.

The vertical axis line represents a symmetry axis of the face, which may be used to correct for head roll.

The median eye substructures (e.g., inner points of tear ducts, inner eye canthi) are robust to illumination and/or makeup and/or gestures, since they are part of a rigid part of the head. The median eye substructures are relatively close and on opposite sides of an axis of symmetry of the head. A median point between the two median eye substructures represents a good estimate for a point on the axis of symmetry of the face, represented by the vertical line.

At 112, computing an offset distance between the vertical axis line and the median nostril point.

Figure 6:
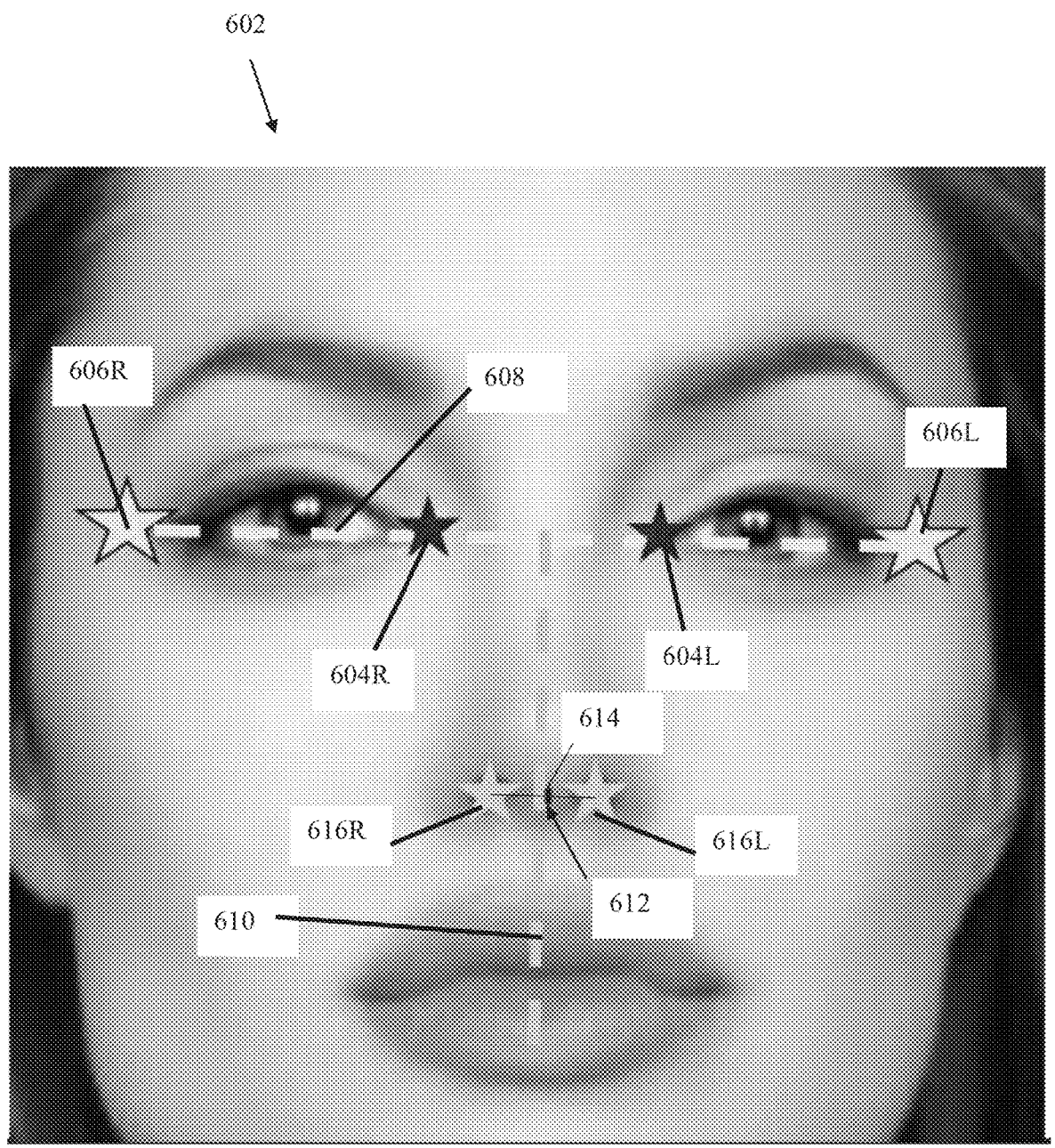
FIG. 6 is an image of a face of a subject labelled with anatomical landmarks and computed lines, in accordance with some embodiments of the present invention.

Reference is now made to FIG. 6, which is an image of a face of a subject labelled with anatomical landmarks and computed lines, in accordance with some embodiments of the present invention. Left and right medial eye substructures 604R-L (e.g., eye tear duct edges) are localized, as described herein. Left and right lateral eye substructure 606R-L are localized, as described herein. Horizontal line 608 connects lateral eye substructures 606R and 606L. Vertical line 610 is orthogonal to horizontal line 608 and passes through the median point between Left and right medial eye substructures 604R and 604L. A distance 612 between vertical line 610 and a median point 614 between nostrils 616R and 616L is indicative of the head yaw, as described herein.

Referring back to FIG. 1, at 114, computing an indication of an estimated yaw angle of the head pose of the subject based on the offset distance. The smaller the offset distance, the lower the yaw angle. An offset distance of zero or close to zero (e.g., within a distance tolerance range) indicates a yaw angle of zero or close to zero (e.g., within an angle tolerance range, for example, within about 0-5 degrees, or 0-10 degree, or 5-10 degrees, or other ranges).

The estimated yaw angle is computed independently of a pitch angle of the head and independently of a roll angle of the head.

Optionally, a dimensionless ratio is computed. The yaw may be estimated based on the dimensionless ratio. The dimensionless ration may be computed as the offset distance divided by an estimation of head width computed as the length of the horizontal line between the lateral eye substructure of the first eye and the lateral eye substructure of the second eye. The dimensionless ratio is correlated with the yaw of the head pose. The closer the dimensionless ratio is to zero, the lower the head pose yaw angle is.

The dimensionless ratio, denoted D, may be computed using the following exemplary equations:

$$A=(x(2)-x(1))/(y(2)-y(1)+eps);$$

$$B=1;$$

$$C=-A*(x(3)+x(4))/2-(y(3)+y(4))/2;$$

$$xt=(x(5)+x(6))/2;$$

$$yt=(y(5)+y(6))/2;$$

$$d=(A*xt+B*yt+C)/\text{sqrt}(A\char`\^2+B\char`\^2);$$

$$D=d/\text{sqrt}((x(2)-x(1))-2+(y(2)-y(1))-2);$$

Where:

x(1), y(1) denote the x,y coordinates of the left lateral eye substructure of the left eye, x(2), y(2) denote the x,y coordinates of the right lateral eye substructure of the right eye, x(3), y(3) denote the x,y coordinates of the left medial eye substructure of the left eye (e.g., left tear duct), x(4), y(4) denote the x,y coordinates of the right medial eye substructure of the right eye (e.g., right tear duct), x(5), y(5) denote the x,y coordinates of the center of the left nostril, and x(6), y(6) denote the x,y coordinates of the center of the right nostril.

When the head pose is small, the vertical line which is defined as the line orthogonal to the horizontal line passing through (x(1),y(1) and (x(2),y(2)) and passing through the point [(x(3),y(3)+(x(4),y(4))/2 passes close to the point [(x(5),y(5)+(x(5),y(5))/2. The offset distance is defined as the distance between the point [(x(5),y(5)+(x(5),y(5))/2 and the nearest point on the vertical line.

The computations described above are invariant to head roll, and/or to head pitch, in particular when the yaw angle is low, for example, in the range of about 0-5, 0-10, 0-15, 5-10, 5-15 degrees, or other ranges. Accuracy of yaw is reduced for large yaw angles. The computations and method described above are invariant to facial features described herein, for example, pupil gaze direction, facial expression, presence of facial hair, presence of makeup, mouth, and the like.

At 116, instructions may be generated for implementation by a user interface to direct the subject to move their head to obtain a minimal offset distance. For example, (i) tilt head upwards for capturing images depicting the subject with head tilted upwards for improved imaging of the nostrils (e.g., when the location of the camera is fixed in place such as for security clearance), (ii) place a camera that captures the 2D image below the nose at an angle facing upwards towards the nostrils, for example, when the user is capturing the image themselves using a camera of a smartphone, and (iii) tilt the head left or right to minimize the yaw angle, for example, to obtain a full frontal image of the face, for example, for automated image recognition.

At 118, features described with reference to 102-116 are iterated for multiple images each depicting the face of the person, for example, at multiple yaw angles, and/or for different facial features (e.g., different pupil gaze directions, different facial expressions, different states of facial hair (e.g., beard and then shaven), states of makeup (e.g., makeup, no makeup, different colored and/or application styles of makeup), different illuminations (e.g., different times of day, different colored lights, different light intensities), and the like.

The respective offset distance may be computed for each of the images. A target image indicative of a full frontal frame of the face of the subject may be selected according to a minimal respective offset distance. The target image with minimal respective offset distance may indicate denotes a yaw angle of less than about 3, 5, 7, 10 degrees, or other values.

At 120, one or more of the following may be provided: the indication of the yaw angle, the indication of the offset distance, and/or the target image for which the offset distance is close to zero, and/or image selected from multiple images for which the offset distance is a minimum.

A fully frontal frame of the face of the subject having about zero yaw may be identified, when the offset is close to zero and/or as the image of multiple images with minimal offset distance.

The fully frontal image may be provided, for example, presented on a display, printed, stored in a data storage device, forwarded to a remote device, and/or provided to another process for further processing.

At 122, the fully frontal image may be provided as an input to another image processing process and/or image processing application, for example, a facial recognition process that is designed to process fully frontal frames with zero yaw. The facial recognition process may be locally stored and executed, and/or remotely stored and executed such as by a remote server. The facial recognition process may recognize a target person depicted in the image. In response to the recognized target person matching a security requirement, security clearance access may be granted to the subject, for example, to access a secure website, to automatically activate a controller of an automated door to grant entrance to the target person (e.g., to enter a secure office building, board a plane). The fully frontal image may be used to initially set the facial recognition process, for example, indicate that the person depicted in the fully frontal image is to be provided with security clearance.

Various embodiments and aspects of at least some implementations of the systems, methods, apparatus, and/or code instructions as delineated hereinabove and as claimed in the claims section below find experimental and/or calculated support in the following examples.

EXAMPLES

Reference is now made to the following examples, which together with the above descriptions illustrate some at least some implementations of the systems, methods, apparatus, and/or code instructions described herein in a not necessarily limiting fashion.

Figure 7:
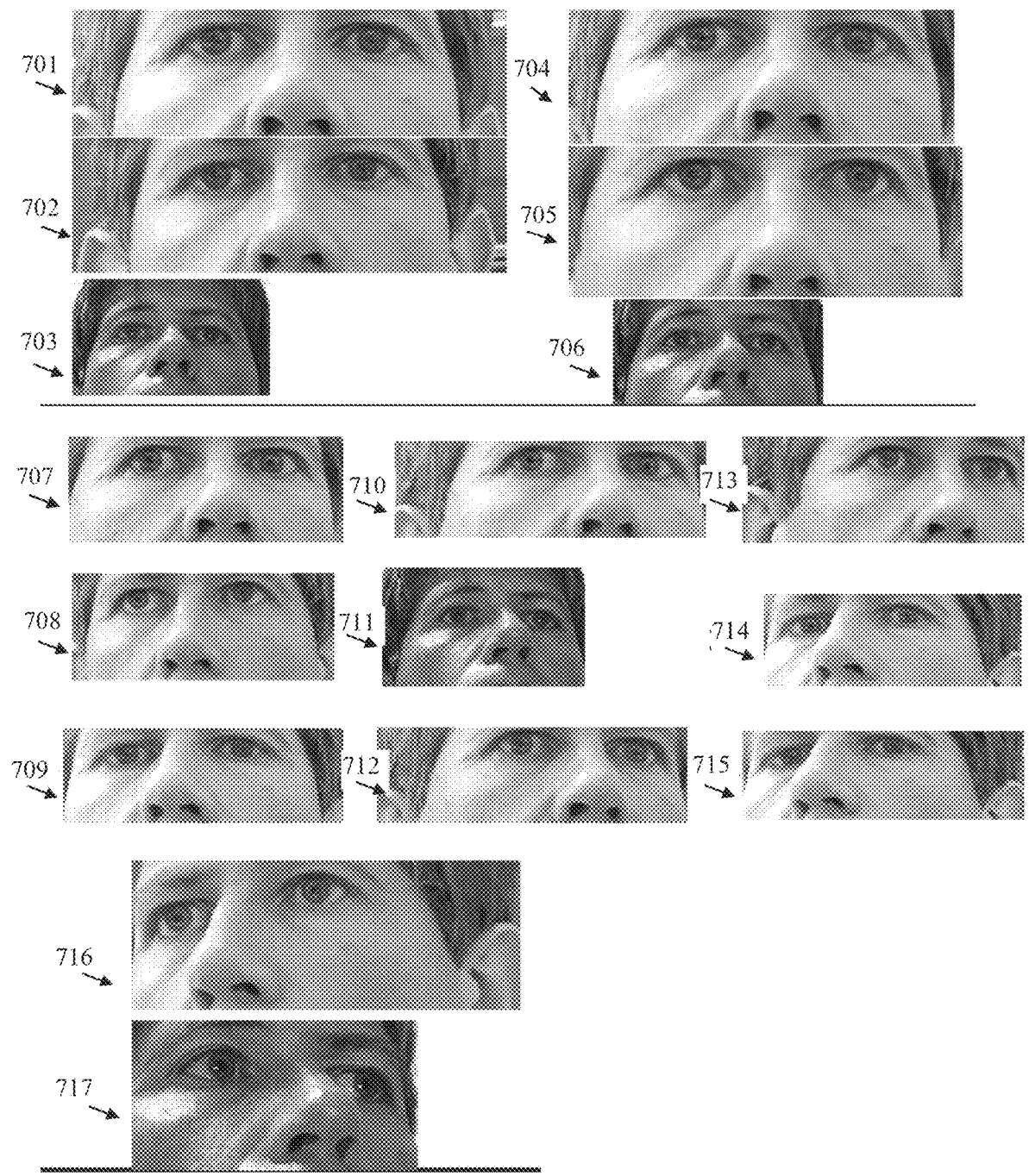
FIG. 7 includes multiple images of a head of a subject were captured by a camera of a Galaxy S9 smartphone, as part of an experiment, in accordance with some embodiments of the present invention.

Reference is now made to FIG. 7, which includes multiple images 701-717 of a head of a subject were captured by a camera of a Galaxy S9 smartphone, as part of an experiment, in accordance with some embodiments of the present invention. The images were captured by placing the smartphone below the level of the nose of the subject, at an angle that captures images where the nostrils are clearly depicted. Two light settings and two different cameras (the front and back cameras) were used. The six anatomical landmarks described herein were marked manually and saved (as described herein, the six anatomical landmarks may be automatically located). The dimensionless ratio, D, was computed for each one of the images. The images were sorted by increasing D values. First image 701 represents the target image of a full frontal image of the face with minimal yaw angle, i.e., zero or close to zero. Last image 717 represents the image with highest yaw angle. From images 701-717, it can be seen that there is a decent monoticity in the visible head pose yaw angle correlated with the increase in D value. The D value may be computed over a wide set of yaw angles and/or different illuminations and/or different cameras. The experiment illustrates that at least some implementations of the systems, apparatus, methods, and/or code instructions described herein are able to accurately select the target image with lowest (close to zero, or zero) yaw angle, even when images are captured with different lighting conditions and/or using different cameras.

Figure 8:
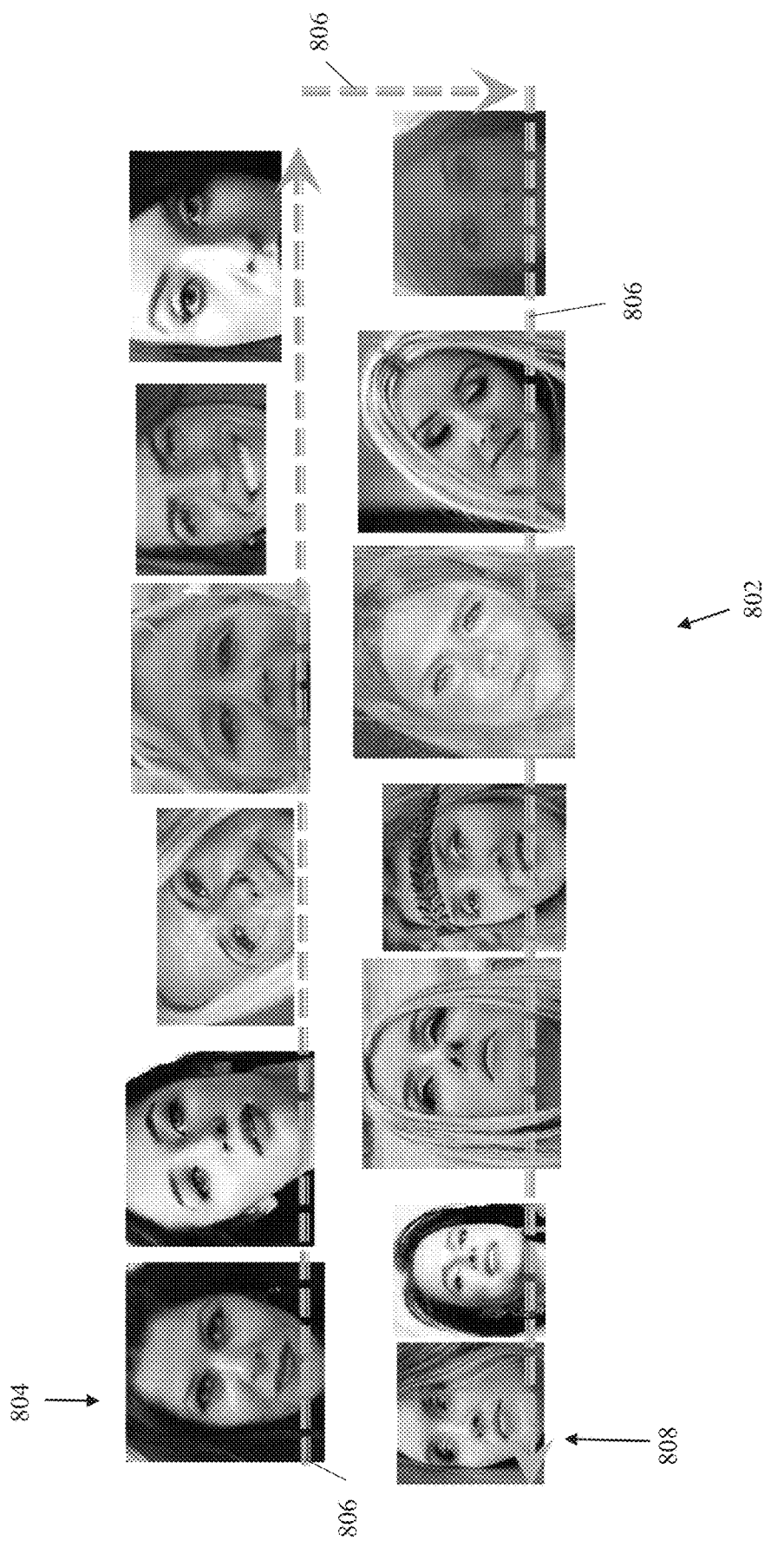
FIG. 8 depicts images of different people captured, sorted by increasing yaw angle based on increasing D values, as part of a computational evaluation, in accordance with some embodiments of the present invention.

Reference is now made to FIG. 8, which depicts images 802 of different people captured, sorted by increasing yaw angle based on increasing D values, as part of a computational evaluation, in accordance with some embodiments of the present invention. Images 802 are of different people, having different facial gestures, different applied makeups, different head tilts, captured by different cameras under different lighting conditions, i.e., "faces from the wild". The six anatomical landmarks described herein were marked manually. The dimensionless ratio, D, was computed for each one of the images. The images were sorted by increasing D values. First image 804 represents the target image of a full frontal image of the face with minimal yaw angle, i.e., zero or close to zero. Subsequent images in increasing D values are arranged along directed line 806. Last image 808 represents the image with highest yaw angle. It is noted that the images 802 are successfully arranged according to increasing yaw angle.

Figure 9:
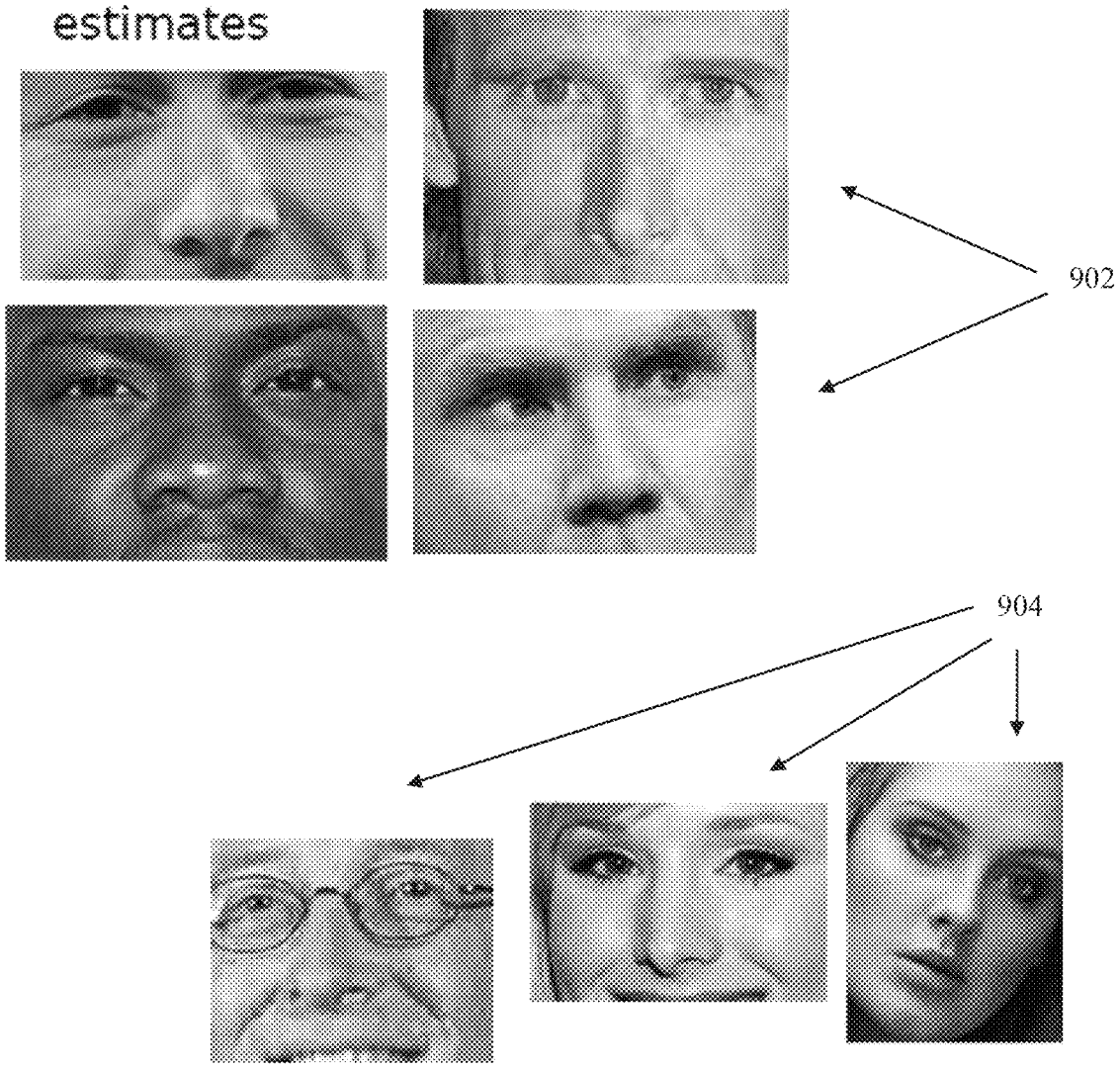
FIG. 9 represents yet another evaluation of images of different people arranged according to computed D value indicative of increasing yaw angle, as part of a computational evaluation, in accordance with some embodiments of the present invention.

Reference is now made to FIG. 9, which represents yet another evaluation of images of different people arranged according to computed D value indicative of increasing yaw angle, as part of a computational evaluation, in accordance with some embodiments of the present invention. Images are of different people, having different facial gestures, different applied makeups, different head tilts, captured by different cameras under different lighting conditions, i.e., "faces from the wild". The six anatomical landmarks described herein were marked manually. The dimensionless ratio, D, was computed for each one of the images. The images were arranged into two groups. A first group of images 902 includes images with lowest head pose yaw estimates based on lowest D values. A second group of images 904 includes images with highest head pose yaw estimates based on highest D values. Each image may be automatically included in the first group or the second group, despite makeup, uneven illumination, face gestures, and pupil gaze direction.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant imaging sensors will be developed and the scope of the term imaging sensor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of computing head pose of a subject in a two dimensional (2D) image, comprising:
   receiving a 2D image of a face of a subject depicting nostrils of the subject;
   analyzing the image to identify a first nostril, a second nostril, a medial eye substructure of a first eye and of a second eye located medially to the respective eye, and a lateral eye substructure of the first eye and the second eye located laterally to the respective eye;
   computing a median nostril point between a first location of the first nostril and a second location of the second nostril;
   computing a horizontal line that horizontally connects the lateral eye substructure of the first eye with the lateral eye substructure of the second eye;
   computing a vertical axis line that is orthogonal to the horizontal line and passes through a median eye point between the medial eye substructure of the first eye and the medial first eye substructure of the second eye,
   computing an offset distance between the vertical axis line and the median nostril point; and
   computing an indication of an estimated yaw angle of the head pose of the subject based on the offset distance.

2. The method of claim 1, further comprising receiving a plurality of images each depicting the face of the person at a plurality of yaw angles, computing a respective offset distance for each of the plurality of images, and selecting a target image indicative of a full frontal frame of the face of the subject according to a minimal respective offset distance.

3. The method of claim 2, wherein the target image with minimal respective offset distance denotes a yaw angle of less than about 5 degrees.

4. The method of claim 1, further comprising computing a dimensionless ratio computed as the offset distance divided by an estimation of head width computed as the length of the first horizontal line between the lateral eye substructure of the first eye and the lateral eye substructure of the second eye, where the dimensionless ratio is correlated with the yaw of the head pose, wherein the yaw is estimated based on the dimensionless ratio.

5. The method of claim 1, further comprising generating instructions for implementation by a user interface to direct the subject to move their head to obtain a minimal offset distance.

6. The method of claim 1, wherein the estimated yaw angle is computed independently of a pitch angle of the head and independently of a roll angle of the head.

7. The method of claim 1, wherein analyzing the image to identify the first nostril and the second nostril comprises processing the image to identify a first and a second contiguous set of pixels below a grayscale threshold in a green channel of the image.

8. The method of claim 1, wherein analyzing the image to identify the medial eye substructure of a first eye and of a second eye comprises performing a template matching process between the image and a template image using normalized 2D cross correlation and/or scale and 2D rotation search space.

9. The method of claim 1, wherein the medial eye substructure comprises an inner edge of a tear duct of the respective eye.

10. The method of claim 1, further comprising providing the indication of estimation of yaw angle to a face processing process.

11. The method of claim 1, further comprising:
   in response to the offset distance being about zero, identifying the image as a fully frontal frame of the face of the subject having about zero yaw, and providing the image as an input to a facial recognition process that is designed to process fully frontal frames with zero yaw.

12. The method of claim 11, further comprising processing the image using the facial recognition process to recognize a target person depicted in the image, and in response to the recognized target person matching a security requirement, granting access security clearance to the subject.

13. The method of claim 1, where the image is captured by a camera located below the nose of the subject, the viewing angle of the camera angled up towards the nostrils.

14. The method of claim 1, further comprising
   generating instructions for implementation by a user interface for providing a message to the subject to at least one of: (i) tilt their head upwards, wherein the received image depicts the subject with head tilted upwards, and (ii) place a camera that captures the 2D image below the nose at an angle facing upwards towards the nostrils.

15. A computing device for computing head pose of a subject in a two dimensional (2D) image, comprising:
 at least one processor executing a code for:
  receiving a 2D image of a face of a subject depicting nostrils of the subject;
  analyzing the image to identify a first nostril, a second nostril, a medial eye substructure of a first eye and of a second eye located medially to the respective eye, and a lateral eye substructure of the first eye and the second eye located laterally to the respective eye;
  computing a median nostril point between a first location of the first nostril and a second location of the second nostril;
  computing a horizontal line that horizontally connects the lateral eye substructure of the first eye with the lateral eye substructure of the second eye;
  computing a vertical axis line that is orthogonal to the horizontal line and passes through a median eye point between the medial eye substructure of the first eye and the medial first eye substructure of the second eye;
  computing an offset distance between the vertical axis line and the median nostril point; and
  computing an indication of an estimated yaw angle of the head pose of the subject based on the offset distance.

16. A non-transitory medium storing a computer program comprising program instructions which, when executed by a processor, cause the processor to:
 receive a 2D image of a face of a subject depicting nostrils of the subject;
 analyze the image to identify a first nostril, a second nostril, a medial eye substructure of a first eye and of a second eye located medially to the respective eye, and a lateral eye substructure of the first eye and the second eye located laterally to the respective eye;
 compute a median nostril point between a first location of the first nostril and a second location of the second nostril;
 compute a horizontal line that horizontally connects the lateral eye substructure of the first eye with the lateral eye substructure of the second eye;
 compute a vertical axis line that is orthogonal to the horizontal line and passes through a median eye point between the medial eye substructure of the first eye and the medial first eye substructure of the second eye;
 compute an offset distance between the vertical axis line and the median nostril point; and
 compute an indication of an estimated yaw angle of the head pose of the subject based on the offset distance.

* * * * *